United States Patent Office.

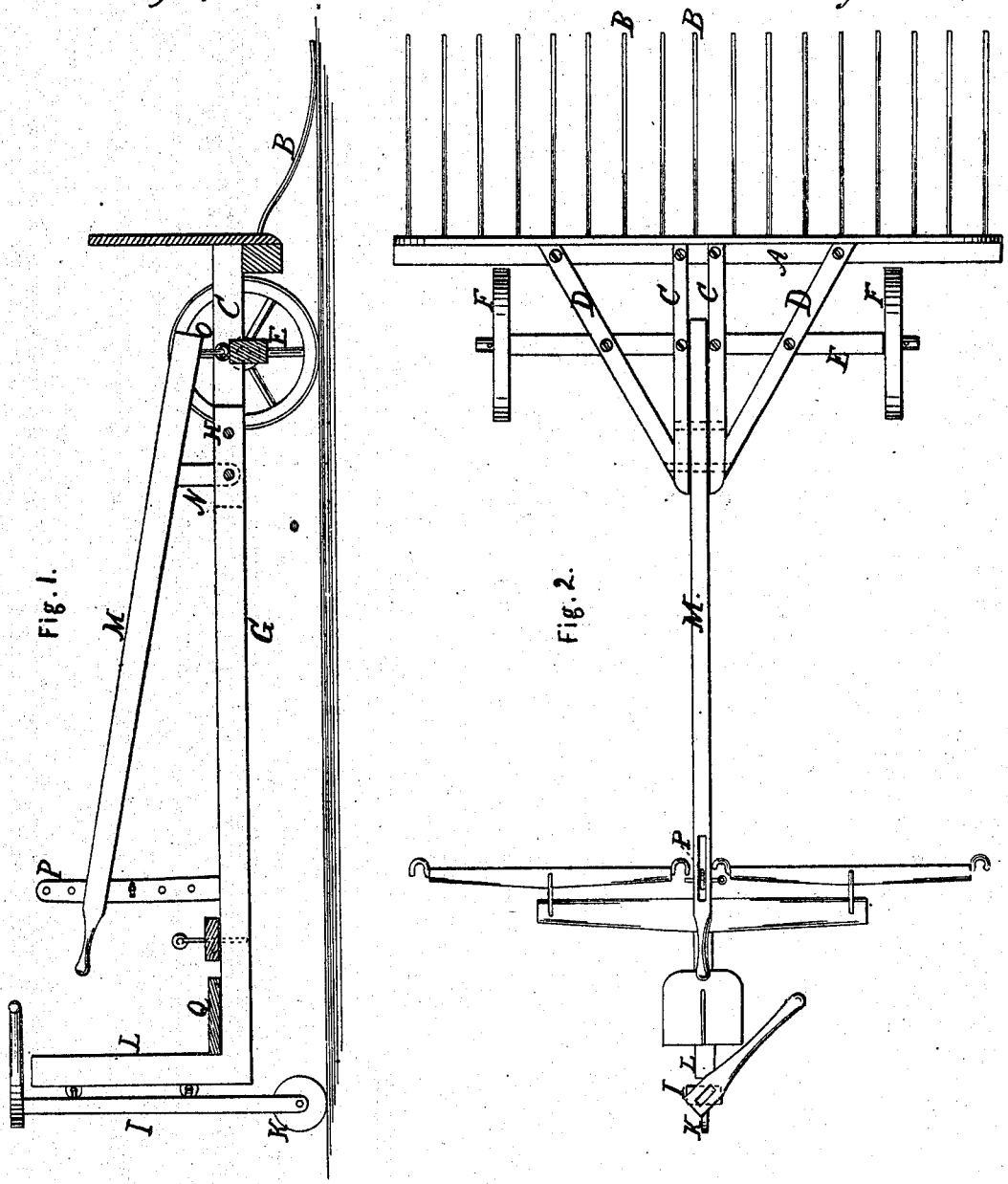

WILLIAM H. MISNER AND GEORGE E. MARKER, OF HEYWORTH, ILLINOIS.

Letters Patent No. 105,967, dated August 2, 1870; antedated July 22, 1870.

IMPROVEMENT IN HAY-RAKE.

The Schedule referred to in these Letters Patent and making part of the same

*To all whom it may concern:*

Be it known that we, WILLIAM H. MISNER and GEORGE E. MARKER, of Heyworth, in the county of McLean and State of Illinois, have invented a new and improved Hay-Lifter; and we do hereby declare that the following is a full, clear, and exact description thereof, which will enable others skilled in the art to make and use the same, reference being had to the accompanying drawing forming part of this specification.

The invention relates to hay-lifters, and consists in the improvement thereon, to be hereinafter specified.

Figure 1 represents a longitudinal sectional elevation of my improved machine, and Figure 2 represents a plan view of the same.

Similar letters of reference indicate corresponding parts.

A represents a rake-head, the teeth, B, of which project forward of the machine.

This head is connected by the parallel bars C and the diagonal braces B to the axle E of the two front wheels F.

The connecting-bar, G, is pivoted at H, between the bar C, and is connected at the rear to the stock I of a caster-wheel, K, by a vertical extension, L, hinged to the said stock.

M represents a lever, having a fulcrum on a bar, N, jointed in a slot near the front end of the connecting-bar G.

The end of the short arm of the said lever is connected by a link, O, to the axle E, and the long arm works up and down on a vertical bar, P, rising from the connecting-bar in advance of the stand Q for the operator, to which bar the lever may be secured by pins or hooks, higher or lower, as required.

The elevation of the long arm of the lever, which is done by the operator, brings the rake-teeth down upon the ground, and the depression of the same raises the teeth up, so that the hay gathered thereon may be conveyed to the stack, or elsewhere.

The stock I of the caster-wheel is provided with a handle for guiding it.

By this machine the hay or other substance may be gathered on the rake, when lying in rows, without being trodden upon by the horses, which travel between the fore and hind wheels.

Having thus described my invention,

What we claim as new, and desire to secure by Letters Patent, is—

An apparatus for raking hay, consisting of a three-wheeled vehicle, guided by the single wheel behind, drawn by one animal on each side of the connecting-pole, and having, directly in front, a vertically-vibrating rake, operated by a hand-lever, the several parts being constructed and arranged as shown and described.

WM. H. MISNER.
GEO. E. MARKER.

Witnesses:
JOHN S. SARGENT,
JAMES C. McFARLAND.